Patented Aug. 13, 1940

2,211,032

UNITED STATES PATENT OFFICE 2,211,032

POLYMERIZATION OF BUTADIENES

Rudolf Seidler, Heidelberg, and Wilhelm Pannwitz, Merseburg, Germany, assignors, by mesne assignments, to Jasco, Incorporated, a corporation of Louisiana No Drawing. Application February 11, 1939, Serial No. 255,880. In Germany February 14, 1938

6 Claims. (Cl. 260—93)

The present invention relates to the polymerization of butadienes in aqueous emulsion.

We have found that the polymerization of butadienes especially in an aqueous emulsion, leads to valuable polymerizates when carried out in the presence of organic bases containing nitro groups and an open-chain double linkage between two carbon atoms or between a carbon atom and a nitrogen atom in the molecule.

Organic nitrogen bases which contain nitro groups and have an open-chain double linkage between two carbon atoms in the molecule, are for example 5-nitro-2-styrylbenzimidazol, obtainable by condensing benzaldehyde with 5-nitro-2-methylbenzimidazol, as well as compounds of a similar type obtainable by the condensation of organic bases containing a nitro group and a reactive methyl group or methylene group with an aldehyde. Organic bases containing a nitro group and an open-chain double linkage between a carbon atom and a nitrogen atom are, for example, Schiff's bases, for example benzal-p-nitraniline, p-nitro-benzal-p-nitraniline, cinnamal-p-nitraniline or p-nitrobenzal-thiosemicarbazone. The said bases are used in catalytic amounts, i. e., in about the same quantities as polymerization accelerators are usually employed, e. g., in amounts of less than 1 per cent calculated with regard to the amount of the polymerizable substance employed. It is most preferable to work at a temperature of 50° C. and above, but lower temperatures may also be employed.

An addition of one of the said substances to the polymerization mixture generally increases the yield of the polymerizate. The new process yields elastic polymerizates, the formation of products of greater hardness and inferior elasticity, such as are often obtained by polymerizing in the presence of oxidizing catalysts only, such as hydrogen peroxide, persulphates and the like, especially if high yields of polymerizates are aimed at, being most certainly prevented. The polymerizates prepared in the presence of the bases above referred to possess an excellent plasticity which they retain even when heated, say at 100° C. or stored in the air for long periods of time, whereas polymerizates obtained with the use of hydrogen peroxide alone as a catalyst have often been deprived of their rubber-like nature and turned hard and brittle when stored for an equal space of time. The polymerizates are also distinguished by a particularly high tensile strength and breaking elongation. The bases, which contain nitro groups and an open-chain carbon double linkage in the molecule may preferably also be used in conjunction with nitranilines.

Besides butadiene itself other butadiene hydrocarbons, such as isoprene or dimethylbutadiene may be polymerized by the new method. Polymerizates of excellent properties are likewise obtained from mixtures of the said butadienes with other organic compounds, which have a carbon double linkage and can be interpolymerized in aqueous emulsions with butadienes, as for example acrylic nitrile, styrene, vinyl methyl ketone or fumaric acid ester by polymerizing in the presence of the said bases.

The said bases can be used in the presence or absence of known polymerization accelerators, especially those giving off oxygen, such as persulphates or hydrogen peroxide. Otherwise the polymerization is carried out in known manner.

The following examples serve to illustrate how the present invention is carried out in practice; the parts are by weight.

Example 1

1000 parts of butadiene are emulsified in a solution of 50 parts of the sodium salt of isopropylnaphthalene sulphonic acid in 1000 parts of water and the emulsion is heated, after the addition of from 2 to 4 parts of benzal-nitraniline, in a pressure-tight vessel at 55° C. for 6 days while stirring. The polymerizate which is formed in an about 90 per cent yield has an excellent elasticity and can be stored for long periods of time without losing its good properties.

Polymerizates having the same good properties are obtained by carrying out the polymerization after the addition of 1 part of sodium persulphate and 1 part of 30 per cent hydrogen peroxide under likewise the same conditions. The duration of the polymerization is thereby considerably shortened.

Example 2

750 parts of butadiene, 250 parts of styrene and from 2 to 3 parts of cinnamal-p-nitraniline are emulsified in a solution of 50 parts of the sodium salt of dibutylnaphthalene sulphonic acid and 2 parts of cellulose methyl ether in 1000 parts of water and the emulsion obtained is heated at from 55 to 60° C. for 2 days while stirring.

The rubber-like polymerizate thus obtained in a high yield retains its good properties unchanged even after several hours' heating at 100° C.

A batch of equal composition, to which, however, no cinnamal-p-nitraniline was added, was polymerized only to an extent of 3 per cent under equal conditions.

Example 3

A mixture of 600 parts of butadiene, 400 parts of styrene and 1 to 1.5 parts of p-nitro-benzal-p-nitraniline is emulsified in a solution of 50 parts of the sodium salt of dibutylnaphthalene-sulphonic acid in 1000 parts of water. The emulsion is shaken at about 45° C. for about 5 days. A rubber-like polymerizate of good elasticity is obtained in a yield which is about 5 to 6 times as large as that obtained by polymerizing without an addition of p-nitro-benzal-p-nitraniline but under otherwise the same conditions.

Example 4

An emulsion of 800 parts of butadiene and 2 parts of 5-nitro-2-styryl-benzimidazol in a solution of 50 parts of the sodium salt of dibutylnaphthalene sulphonic acid in 800 parts of water is shaken at 55° C. for 4 to 5 days whereby a rubber-like polymerization product is obtained in an approximately quantitative yield. When polymerizing without an addition of nitrostyrylbenzimidazol under otherwise identical conditions, considerably lower yields are obtained.

What we claim is:

1. In the polymerization of butadienes in an aqueous emulsion, the step which comprises carrying out the polymerization in the presence of catalytic amounts of an organic base containing at least one nitro group and being selected from the group consisting of organic bases containing an open-chain double linkage between two carbon atoms and bases containing an open-chain double linkage between a carbon atom and a nitrogen atom.

2. In the polymerization of butadienes in an aqueous emulsion, the step which comprises carrying out the polymerization in the presence of catalytic amounts of an organic base containing at least one nitro group and being selected from the group consisting of organic bases containing an open-chain double linkage between two carbon atoms and bases containing an open-chain double linkage between a carbon atom and a nitrogen atom and in the presence of a catalytic amount of a substance giving off oxygen.

3. In the polymerization of a mixture of a butadiene and another organic compound selected from the group consisting of acrylic nitrile, styrene, vinyl methyl ketone and fumaric acid esters in aqueous emulsion the step which comprises carrying out the polymerization in the presence of catalytic amounts of an organic base containing at least one nitro group and being selected from the group consisting of organic bases containing an open-chain double linkage between two carbon atoms and bases containing an open-chain double linkage between a carbon atom and a nitrogen atom.

4. In the polymerization of butadienes in an aqueous emulsion the step which comprises carrying out the polymerization in the presence of catalytic amounts of benzal-p-nitraniline.

5. In the polymerization of butadienes in an aqueous emulsion, the step which comprises carrying out the polymerization in the presence of catalytic amounts of 5-nitro-2-styryl-benzimidazol.

6. In the polymerization of a mixture of butadiene and styrene the step which comprises carrying out the polymerization in the presence of catalytic amounts of an organic base containing at least one nitro group and being selected from the group consisting of organic bases containing an open-chain double linkage between two carbon atoms and bases containing an open-chain double linkage between a carbon atom and a nitrogen atom.

RUDOLF SEIDLER.
WILHELM PANNWITZ.